United States Patent [19]

Nakamori et al.

[11] Patent Number: 4,476,098
[45] Date of Patent: Oct. 9, 1984

[54] MICROWAVE HEATED FLUIDIZED BED REACTOR HAVING STAGES

[75] Inventors: Yutori Nakamori, Yokohama; Tsuyoshi Matsumura, Chiba; Takeshi Kubota, Kitasohma, all of Japan

[73] Assignees: Mitsui Eng. & Shipbuilding; Mitsui Petrochem. Ind., both of Tokyo; Tokyo Shibaura Denki K.K., Kanagawa, all of Japan

[21] Appl. No.: 380,671
[22] PCT Filed: Sep. 1, 1981
[86] PCT No.: PCT/JP81/00209
§ 371 Date: May 3, 1982
§ 102(e) Date: May 3, 1982
[87] PCT Pub. No.: WO82/00779
PCT Pub. Date: Mar. 18, 1982

[30] Foreign Application Priority Data

Sep. 2, 1980 [JP] Japan .................. 55-121606

[51] Int. Cl.$^3$ .................. B01J 8/26; B01J 8/42; B01J 19/08
[52] U.S. Cl. .................. 422/140; 422/142; 422/143; 422/146; 422/159; 422/186; 422/186.29; 422/903
[58] Field of Search .................. 422/186, 186.29, 142, 422/146, 159, 903, 140, 143

[56] References Cited

U.S. PATENT DOCUMENTS 2,977,194 3/1961 Loeding et al.
4,221,680 9/1980 Hardwick et al. .................. 422/159 X
4,247,518 1/1981 Charlet et al. .................. 422/142
4,399,106 8/1983 Ueda .................. 422/142 X

FOREIGN PATENT DOCUMENTS 55-7527 1/1980 Japan.
84534 6/1980 Japan .................. 422/142
55-90424 7/1980 Japan.
183327 11/1982 Japan .................. 422/140

OTHER PUBLICATIONS

Lynch, E. P., "The Use of Microwave Energy in Conjunction with Fluidized Bed Reactors", prepared for *3rd International Conference of Environmental Problems of the Extractive Industries*, Dayton, Ohio, Nov. 29, 1977.
Botterill, J. S. M., *Fluid-Bed Heat Transfer*, Academic Press, N.Y., N.Y. (1975), pp. 132–133.
Perry, R. H. and C. H. Chilton, *Chemical Engineers' Handbook*, 5th ed., 1973, McGraw-Hill, NY, pp. 20-72.

*Primary Examiner*—Deborah L. Kyle
*Assistant Examiner*—Matthew A. Thexton
*Attorney, Agent, or Firm*—Armstrong, Nikaido, Marmelstein & Kubovcik

[57] ABSTRACT

An improvement in or relating to the fluidized bed-type heating reactor for introducing into the fluidized bed thereof a water-containing substance to be treated such as an uranyl nitrate solution and subjecting the substance to heat treatment. The reactor of the invention is provided with a microwave-generating means for applying microwaves to the fluidized bed and thereby heating the same.

6 Claims, 6 Drawing Figures

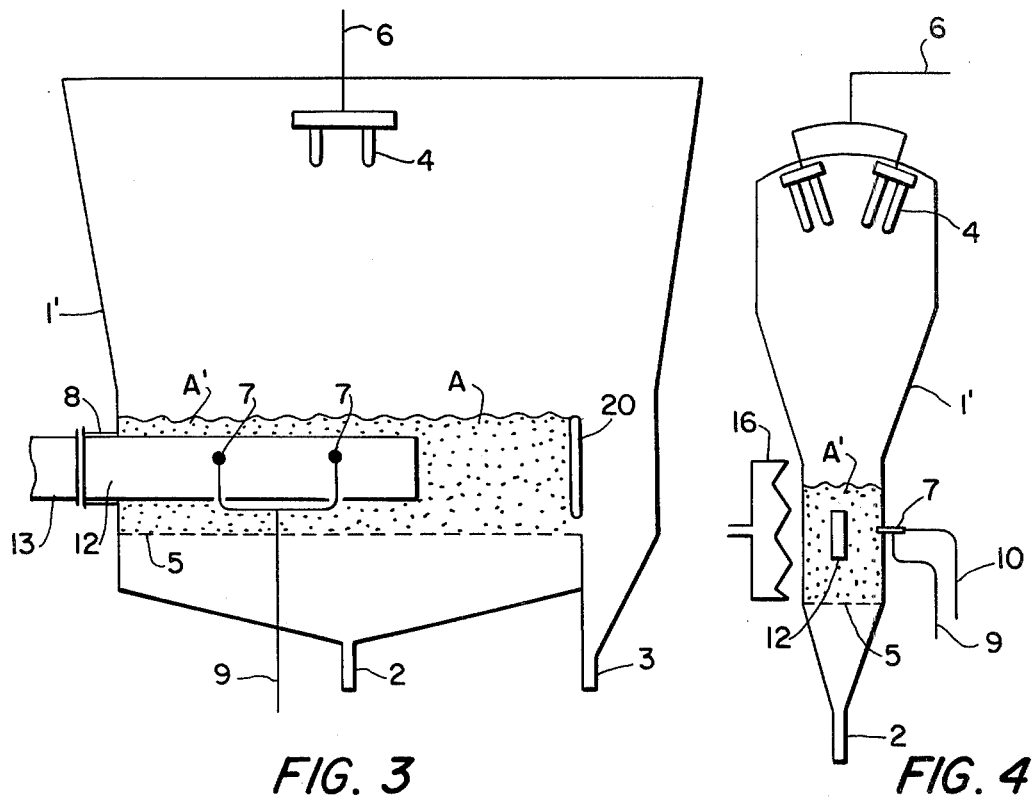
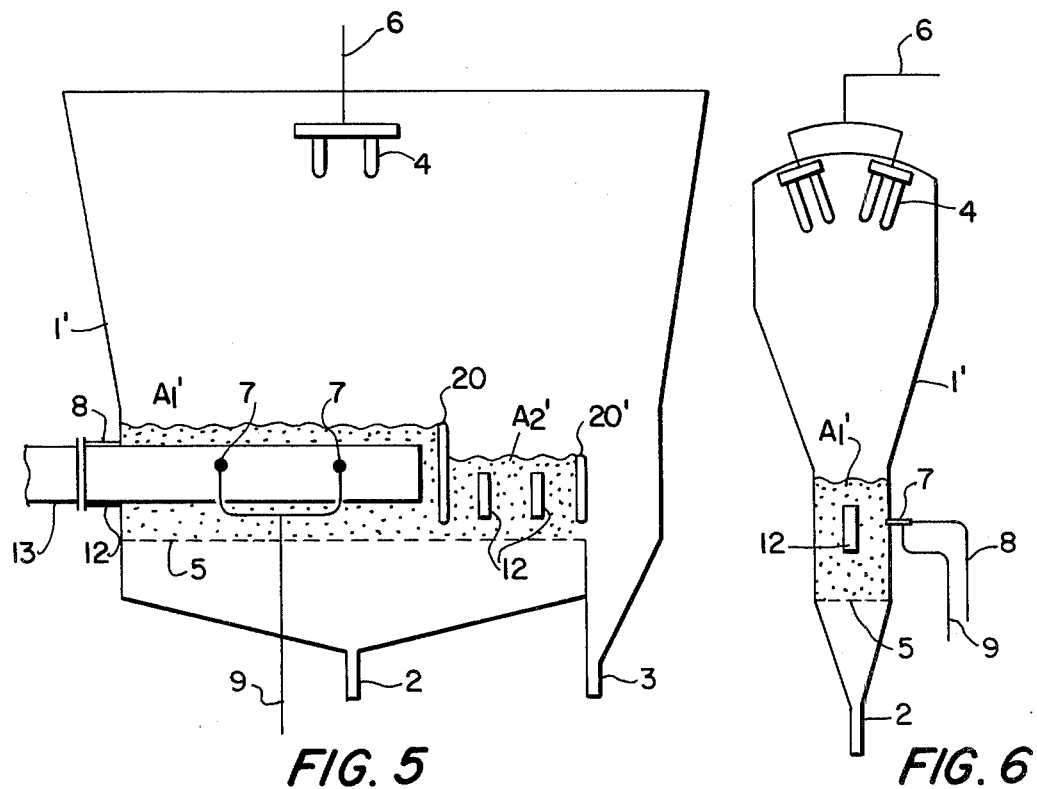

MICROWAVE HEATED FLUIDIZED BED REACTOR HAVING STAGES

DESCRIPTION

1. Technical Field

The present invention relates to a fluidized bed-type heating reactor and, more specifically, such a fluidized bed-type heating reactor which is so structured as to receive in the fluidized bed formed therein a watercontaining substance to be heat-treated such as an uranyl nitrate solution for example, and for heat-treatment of the substance, apply microwaves thereto.

2. Background Art

Fluidized bed-type heating reactors generally comprise a column provided therein with a dispersion plate, on which formed is a fluidized bed into which a substance is introduced for heat-treatment, and for means for heating, they rely on hot air which is supplied under pressure from below the dispersion plate.

Where a reactor of the mentioned type is utilized in or for a process in which present is a high water-content condition and which as a whole comprises a process of an enthalpy ruled rate, it is technically and/or economically difficult to meet the whole of a required heat quantity solely by means of hot air, and it therefore is required to provide an additional or auxiliary heating means.

One example of such enthalpy-ruled rate processes is the denitration reaction process that constitutes a part or portion of reprocessing of spent nuclear fuels. This reaction process is for converting by pyrolysis an uranyl nitrate solution to uranium oxide with moisture and $NO_x$ gas liberated, and the heat quantity required in this case is of the order of 2000 Kcal/KgU, approximately. Thus, with fluidized bed-type heating reactors conventionally employed for the mentioned-type denitration reaction, employment is made for their heating means of a so-called external heating system which utilizes for example a resistance heater disposed on the outer wall of the reactor. A difficulty with such external heating system resides in that the supply of the required heat quantity cannot be made with ease and at a high efficiency. That is to say, according to the heating system in reference a certain limit exists with respect to the heat transfer area, and it therefore is indispensable to determine and select for employment an optimal means for supplying the required heat quantity. Particularly, when a scaling-up is contemplated of an existing reactor so as to have the amount of treatment or the capacity for treatment increased, the selection of heating means is difficult to make. Further, in maintaining high the temperature of this portion of the reactor wall which corresponds to the location of the fluidized bed so as to secure a sufficient heat application as desired, another problem is posed relating to the anticorrosion of the structuring material of the reactor; also, in accordance with an increase in the heat release toward outside the reactor, heat loss is increased. Furthermore, to raise high the temperature of the wall of the reactor tends to produce a difficulty in connection with the particle-size control of $UO_3$ powder to be formed; besides, it is then likely due to a poor heat conduction attributable to a temporary flow failure of the fluidized bed that the fluidized bed undergoes agglomeration, caking and so forth, whereby the serious trouble is generated of the reactor being made inoperable.

In view of the above, it may be devised to employ an internal heating system in which the heating means for example a resistance heater is provided inside the reactor column, but insofar as the substance to be treated contains a radioactive component, unavoidable is to prevent the radioactive substance from being externally leaked, whereby structural difficulties are involved in this case again from the viewpoint of maintenance and replacement of the heater. In addition, particularly in the case of generally employed cylindrical fluidized beds, a dimensional limitation cannot be avoided of the internal heater in order to maintain a good fluidized condition of the bed forming particles, whereby if an increase is made of the heat transfer area, the effect thereof cannot fully be exhibited.

In view of the foregoing described background art, the present inventors have conducted extensive studies to arrive at the present invention, the object of which is to provide such a fluidized bed-type heating reactor which is so structured as to receive a water-containing substance to be heat-treated in the fluidized bed thereof and apply microwaves to the fluidized bed so that the substance can be thereby advantageously heat-treated.

DISCLOSURE OF THE INVENTION

That is to say, the present invention consists in a fluidized bed-type heating reactor which is adapted to have a water-containing substance such as an uranyl nitrate solution introduced into the fluidized bed thereof and have the introduced substance treated by heating and in which a microwave-generating means is housed for applying microwaves to the fluidized bed to thereby have it heated. By such arrangement according to the invention, the substance to be heat-treated in the fluidized bed can be extremely advantageously heated. Heat-treatment termed herein means such a treatment by which such as dehydration, denitration, oxidation and so forth are effected by heating a substance to be treated.

BRIEF DESCRIPTION OF THE DRAWINGS

Several figures of the accompanying drawings illustrate embodiments of the present invention, in which:

FIG. 3 represents a front view of a horizontal fluidized bed-type heating reactor;

FIG. 4 shows a side elevation of the reactor of FIG. 3;

FIG. 5 represents a front view of a horizontal multistage fluidized bed-type heating reactor; and FIG. 6 shows a side elevation of the reactor of FIG. 5.

BEST MODE FOR CARRYING OUT THE INVENTION

Now, with reference to the accompanying drawings, the present invention will be described in connection with the instance in which the fluidized bed-type heating reactor according to the invention is utilized in or for the denitration step constituting a part or portion of reprocessing steps for spent nuclear fuels.

Figure 1:
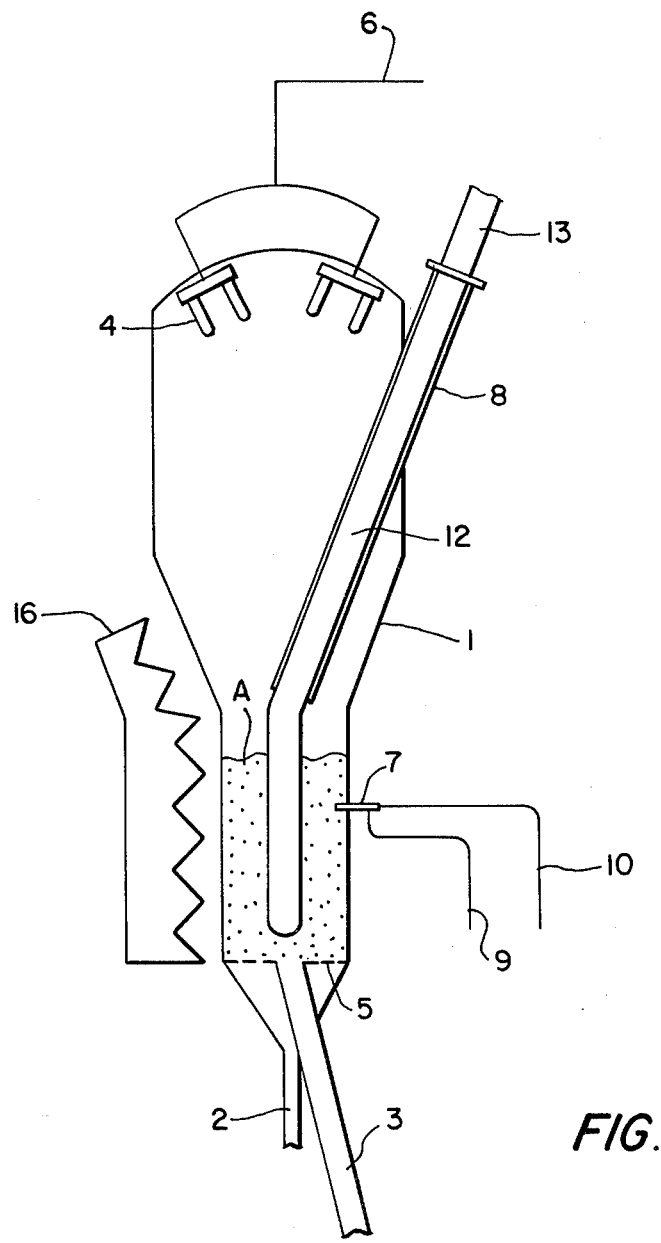
FIG. 1 represents a front view of a cylindrical fluidized bed-type heating reactor.

FIG. 1 shows a front elevation, representing the case in which the fluidized-bed heating reactor is structured in a cylindrical configuration, in which the reference numeral 1 denotes a reactor main body made of stainless steel, which is structured such that it receives a substance to be treated in a closed manner therein, permitting no leakage of a radioactive component contained in the substance to be treated, while it at the same time functioning as a microwave shielding wall as later to be described. This main body 1 has in its lower end portion an aeration pipe line 2 for supplying air into the main body and a discharge pipe line 3 opened on a dispersion plate 5, for discharging formed matters out of the main body, and at its upper end portion, a blowback filter 4 for removing out of the body and recovering fine dusts entrained by ascending air and also an exhaust pipe line 6 for deaeration of the interior of the body 1. In the side wall of the main body 1, further, there are provided a spray nozzle 7 opened in a fluidized bed A formed of powder or dust of $UO_3$ and also a waveguide duct 8. To the spray nozzle 7, feed pipe lines 9 and 10 through which to feed an uranyl solution, a substance to be treated, are connected. With the waveguide duct 8, an upper end portion thereof is protruded out of the main body 1 as shown also in FIG. 2 and, at its top end, provided with a flange 11, while its lower end is extended to reach the proximity of the surface of the fluidized bed A. Further, at least the portion of the duct 8 protruded out of the main body 1 is made of stainless steel, and an arrangement is made such that leakage of radioactive components and of radio waves can be effectively checked. In the waveguide duct 8, an irradiation duct 12 is housed, which is structured by a heat-resistant material having a microwave transmittance such as for example alumina, zirconia or the like. The irradiation duct 12 extends with its lower end portion into the fluidized bed A, in which an open space is formed for introducing microwaves in. The reference numeral 13 denotes a microwave waveguide connected to a microwave generator not shown. This waveguide 13 is provided with a flange 14, which is coupled to the flange 11 of the waveguide duct 8 through a diaphragm 15 made of a microwave conductive material such as teflon for example. The reference character 16 represents a heating device, for example a resistance-type heater, which is provided external to the reactor main body 1.

In operation with use of the reactor described above, it may be performed to charge $UO_3$ powder in the main body 1 to form a fluidized bed A, and when air is then introduced into the fluidized bed A through the aeration pipe line 2 and also atomized uranyl nitrate solution which is introduced through the spray nozzle 7, the atomized droplets of uranyl nitrate solution become attached on surfaces of the $UO_3$ powder particles. On the other hand, microwaves are then guided into the fluidized bed A through the irradiation duct 12, so that droplets of uranyl nitrate solution attached on surfaces of the $UO_3$ powder become heated, and the water and nitrate group in the solution are therefore converted to steam and $NO_x$ gas, respectively. While the exhaust gas containing steam and $NO_x$ gas are permitted to go up within the main body 1, it entrains fine dusts of $UO_3$, therefore it may be subjected to filtering of the fine dusts for example through a blowback filter such as indicated at 4 (a filter capable of backwashing) and may then be liberated into air, if necessary further through a device for removing nitrogen oxides. With $UO_3$ powder particles, on the other hand, they undergo a size growth or enlargement by the attachment on their surfaces of $UO_3$ and are then recovered through the discharge pipe line 3. In the above steps of the operation, a portion of the formed $UO_3$ peels off the particle surfaces of the $UO_3$ powder or becomes independent powder particles, so that the operation can be performed continuously.

It will be understood that during operation of the above described reactor according to the present invention, microwaves are not permitted to leak out but are fully effectively utilized and that the radioactive substance is completely shielded in the main body 1 by the waveguide duct 8 and the diaphragm 15 and is therefore not likely to leak out.

Further, although the invention is described in the foregoing in connection with such an instance in which the irradiation duct 12 extended into the fluidized bed A is provided in the number of only one, such duct 12 may be provided in a plural number where necessary so as to effect a uniform heating of the bed 1, or it may be dispensed with and, instead thereof, employment may be made of the alone of the waveguide duct 8. Also, as before described, an external heater such as the one indicated at 16 may be made a co-use of with the microwave heating system.

Figure 2:
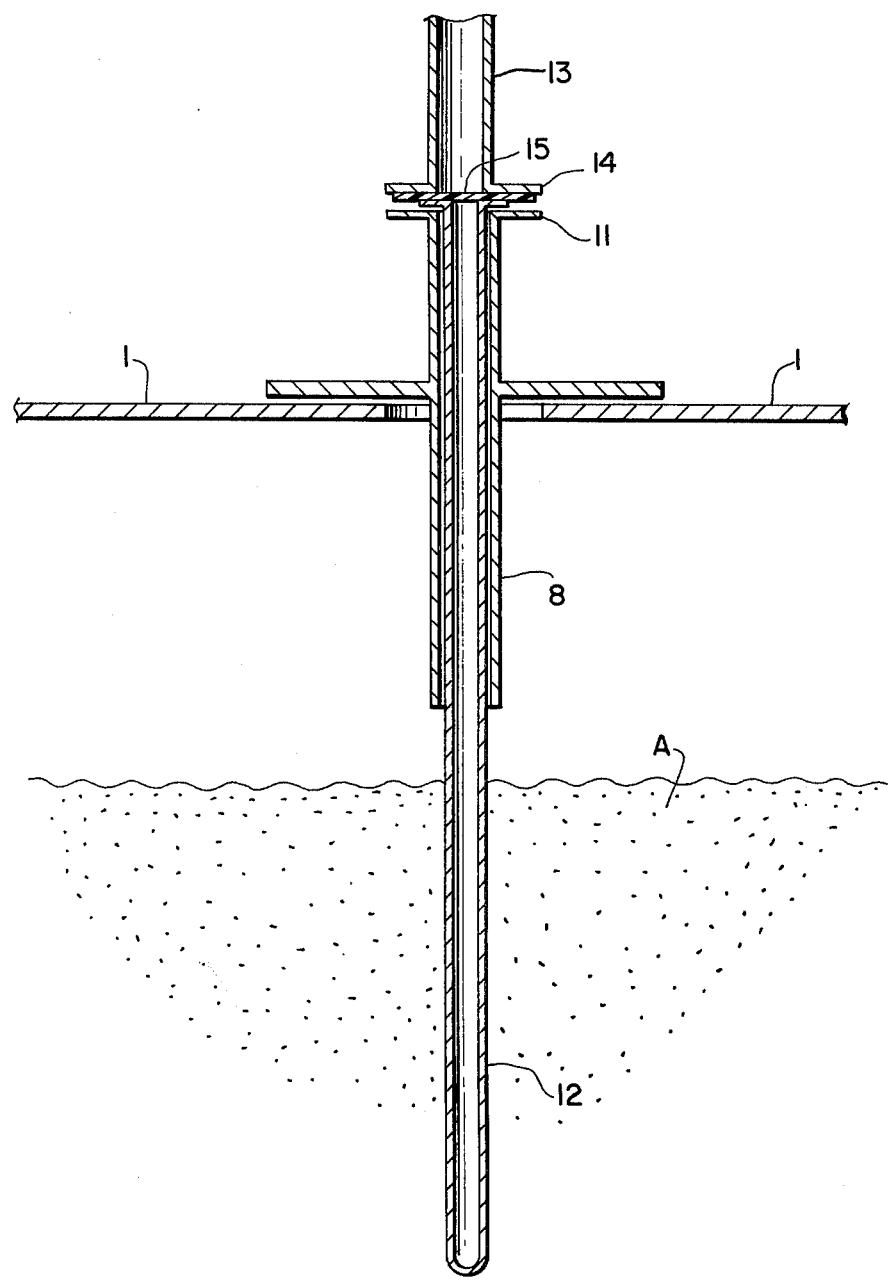
FIG. 2 is a view illustrating an example of the microwave introduction part in the reactor.

FIGS. 3 and 4 illustrate another embodiment of the fluidized-bed heating reactor according to the present invention, in which while FIG. 3 showing a front elevation of the reactor, FIG. 4 shows a side elevation thereof and in which identical reference characters denote identical elements or members as in FIGS. 1 and 2. This embodiment to be considered is particularly suitable for treating a substance (an uranyl nitrate solution) in large amounts, in the denitration step forming a part of reprocessing of spent nuclear fuels.

That is to say, with the substance to be treated there exists a critical safety problem, and in view thereof, a certain limitation is applicable with respect to the diametral size or thickness of the reactor column. Thus, if a cylindrical reactor such as shown in FIG. 1 for example is employed, the height of the reactor column is subject to a limitation and it therefore is required to install a number of reactor columns. However, if, as in the present embodiment, the reactor main body is made comprising a horizontal one as indicated at 1' and if the fluidized bed is made longer in the lateral direction than in the vertical direction as indicated at A', by this it is feasible to attain an increase in the treating amount of the substance with use only of a single reactor. The reference character 20 represents an overflow weir.

FIGS. 5 and 6 together show a modified example of the reactor shown in FIGS. 3 and 4, and while FIG. 5 showing a front view of the modified example, FIG. 6 shows a side view thereof.

In this example, an overflow weir 20' is provided further to the weir 20 in FIG. 3, and the fluidized bed A' is divided into two parts $A'_1$ and $A'_2$, in the latter of which lateral irradiation ducts 12' are provided. According to this arrangement, the microwave irradiation can be performed at different degrees of exposure through the duct 12 and through the ducts 12'. Since the substance heated in part $A'_1$ of the fluidized bed can be further heated in part $A'_2$, there can be made a fuller treatment, that is, it is feasible to reduce the amount of residual moisture and nitrate group.

As described above, in the reactor device according to the present invention, the fluidized bed A is heated by microwaves. Microwave heating can exhibit a particularly high heating effect toward moisture or water, and it can therefore be highly effectively utilized in automatically selectively heating a solution spray-supplied into a fluidized bed or any water content scattered or otherwise locally present in the fluidized bed; further, heating in this case takes place directly through absorption of microwaves by the substance being heated, so that it is free of a limitation with respect to geometrical configurations of the heat transfer area; and in addition, microwaves are introduced into the fluidized bed according to the present invention, so that the fluidized bed can be with ease heated from inside thereof. Thus, various advantages can be brought about according to the present invention, as follows:

(1) A water-containing portion in a fluidized bed which forms one of main causes of troubles in or with fluidized beds can be automatically selectively heated, so that effectively prevented from occurring can be agglomeration, caking or the like of the fluidized bed which is likely when operation lacks stability or attributable to an operation failure.

(2) On account of an internal heating system employed, the heat transfer area on the reactor outer wall can be reduced, so that a reduction in the reactor size and/or a rationalization of the reactor configuration can be realized, therefore it is feasible to design such a fluidized bed configuration by which a fluidization of the bed can be provided in stability.

(3) The invention can with ease be applied to horizontal-type fluidized-bed uranium denitration apparatus which are suitable for effecting a scaling-up for increasing the treatment amount, and in this case, selection of the position for installation and the number of the microwave waveguide can be easified, therefore, the advantage of the internal heating system can be more fully exhibited.

(4) With the reactor arrangement in which a dispersion plate is mounted in a lower portion within the reactor in a manner of laterally extending from one end to a location adjacent the other end of the reactor, a weir is disposed on the dispersion plate at the above-mentioned location adjacent the other end, a fluidized bed is formed in the space on the dispersion plate formed between the reactor wall and the weir, and microwave irradiation means is disposed in the fluidized bed, it is feasible to obtain a relatively long time of stay of a substance to be treated in the fluidized bed, and to carry out a continuous operation by way of charging a substance to be treated in a portion of the fluidized bed located remote from the weir and, while the substance to be treated is being conveyed toward the weir, subjecting the substance to heating by microwaves and by taking out the treated substance over the weir; further, the amount of irradiation of microwaves can be suitably adjusted in proportion to the water content in the substance to be treated, so that it is feasible to treat a substance in mass.

(5) By providing a plurality of weirs in the reactor arrangement recited in paragraph (4) above, it is feasible to provide a plurality of divided fluidized bed portions in the reactor, and it is then feasible to carry out heating at varied degrees in separate fluidized bed portions in accordance with various possible conditions of the divided bed portions.

(6) Fluidized bed reactors can with ease be so arranged as to have a larger diametral part in their upper portions and a smaller diametral part in their lower portions, so that an appropriate space can be with ease secured for introducing microwaves in, whereby it is feasible to put a microwave power of a large capacity in a substance introduced into the fluidized bed.

(7) The microwave heating of the internal heating system may be employed either singly or in combination with an external heating system such as by a resistance-type heater, so that selection of the heating system can be made with ease.

(8) A forward end portion of the irradiation duct is so disposed as to lie in the fluidized bed, so that heating can be effected in a uniform manner and at a high efficiency in the fluidized bed.

CAPABILITY OF EXPLOITATION IN INDUSTRY

Whereas the present invention has been described in connection with the instance in which the fluidized bed-type heating reactor embodying the invention is applied as a denitration reactor for reprocessing spent nuclear fuels, it will be apparent that the reactor according to the present invention can be made various other applied uses and that in connection with the described specific structural features of the invention, various changes and modifications can with ease be made without departing from the spirit of the invention.

We claim:

1. A fluidized bed-type heating reactor of the form in which water-containing nuclear fuel material is introduced into a fluidized bed so as to undergo a heat-treatment, characterized in that a dispersion plate is provided in a lower portion within a reactor main body laterally extending from one side to a point in the vicinity of the opposite side of the reactor main body; at least two weirs are mounted above the dispersion plate, the at least two weirs being step-wise reduced in height to a discharge opening of the reactor main body, the fluidized bed being partitioned by said at least two weirs into a plurality of laterally continuously arranged fluidized-bed portions; means for delivering microwaves to each of the fluidized-bed portions comprising a waveguide duct which houses one end of an irradiation duct, the other end of which is disposed in respective fluidized bed portions so as to apply microwaves to thereby heat the fluidized-bed portions to different temperatures and have the nuclear fuel material heat-treated.

2. A fluidized bed-type reactor as set forth in claim 1, characterized in that externally at a wall portion of said reactor main body substantially corresponding to the location of the fluidized bed, there is a heater provided for heating said wall portion.

3. A fluidized bed-type heating reactor as set forth in claim 1, characterized in that in an upper portion of said reactor main body there is a filter incorporated for removing and recovering fine particles entrained by air.

4. A fluidized bed-type heating reactor as claimed in claim 1, characterized in that said reactor main body has in an upper portion thereof a large diametral part having a lower end portion of a reduced diameter and has a small diametral part formed from the bottom of said lower end portion and in that said fluidized bed is formed in said small diametral part.

5. A fluidized bed-type heating reactor as set forth in claim 1, characterized in that means is incorporated for introducing a substance to be treated into said fluidized bed, said means comprising a spray device having a spray opening opened in said reactor main body.

6. A fluidized bed-type heating reactor as set forth in claim 1, characterized in that said watercontaining substance to be treated is an uranyl nitrate solution.

* * * * *